United States Patent [19]

Spalding

[11] 4,209,058
[45] Jun. 24, 1980

[54] PROCESS FOR PRODUCING MASTER CYLINDERS

[75] Inventor: George T. Spalding, Monroe City, Mo.

[73] Assignee: Diemakers, Inc., Monroe City, Mo.

[21] Appl. No.: 702,880

[22] Filed: Jul. 6, 1976

[51] Int. Cl.² ................ B22D 19/02; B22D 19/08
[52] U.S. Cl. ................................. 164/100; 164/113
[58] Field of Search ............. 164/98, 332, 334, 100, 164/106, 99

[56] References Cited

U.S. PATENT DOCUMENTS

| | | | |
|---|---|---|---|
| 875,448 | 12/1907 | Milne | 164/332 |
| 1,549,218 | 8/1925 | Raym | 164/106 |
| 3,307,423 | 3/1967 | Dansi | 164/111 |
| 3,424,483 | 1/1969 | Harrison | 164/30 |
| 3,888,295 | 6/1975 | Schillinger | 164/98 X |
| 4,003,422 | 1/1977 | Schramm et al. | 164/98 |
| 4,008,749 | 2/1977 | Bellocci et al. | 164/119 |

FOREIGN PATENT DOCUMENTS 40-5409  3/1965  Japan ......................... 164/99

OTHER PUBLICATIONS 40-24764 10001965 JPX 164 100
"The German Printed Publication", Off. 2,330,803, 1/75.
"The German Printed Publication", Aus. 1,282,243, 11/68.

Primary Examiner—Robert D. Baldwin
Assistant Examiner—K. Y. Lin

[57] ABSTRACT

Strong, light weight master cylinders for hydraulic braking systems are produced by incasing a section of steel tubing within a diecasting of metal such as an alloy of magnesium or aluminum. Master cylinders can thus be produced by diecasting the metal in situ around the tube so that it incases the exterior surface and extends over one end thereof. Tooling requirements are minimal, with little if any machine being needed following the diecasting operation. Unit production cost is thus lower than that of castings made with permanent molds. Light weight diecastable metals can thus be used in combination with strong but relatively thin steel tubing to provide durable master cylinders that are lighter, simpler and less expensive to make than cast iron cylinders.

9 Claims, 4 Drawing Figures

PROCESS FOR PRODUCING MASTER CYLINDERS

BACKGROUND OF THE INVENTION

The present invention pertains to brake cylinders used with hydraulic braking systems and more particularly pertains to hydraulic brake master cylinders which can be much lighter in weight than those made of cast iron or steel, yet which are nonetheless able to satisfy stringent requirements of strength, reliability and durability.

Master cylinders used with the hydraulic braking systems of automobiles have been produced largely from cast iron which must be cast in molds. Upon removal from the molds, the iron castings are somewhat rough, and considerable postcasting machining must be resorted to in producing a finished product. The cylinder bore for one or more hydraulic pistons must be reamed to the desired size and tolerance, various holes and/or channels must be drilled in the casting, and openings for pressure tubing must be tapped to provide threads. Although steps are taken to reduce costs, considerable time and effort are nonetheless required to finish a master cylinder, and the relatively thick casting of iron is quite heavy, difficult to handle, and is significantly contributory to the total weight of an automobile on which the cylinder is mounted.

The automotive industry has become increasingly involved with the problem of reducing the weight of automobiles in order to satisfy customer expectations as regards size, performance, price and operating cost while also anticipating or conforming to government regulations on safety, emissions, and gasoline mileage. As a consequence, the automobile designer is frequently confronted with a dilemma when consumer desires and laws designed to protect the consumer are in conflict with each other. It is therefore oftentimes difficult for the manufacturer to find ways for reducing the weight of an automobile without compromising safety or increasing manufacturing costs.

Discovery of a safe and economical way to reduce the total weight of a car by only a fraction of a percent is important in view of the fact that a number of such discoveries can result in a considerable reduction in total weight.

A principal object of the present invention is, therefore, to provide an improved hydraulic brake master cylinder whereby the aforementioned disadvantages associated with manufacture and use of cast iron master cylinders is alleviated.

Another object is to provide an improved hydraulic brake master cylinder that is lighter in weight yet strong and serviceable.

Still another object is to provide a master cylinder of lighter weight whereby the total weight of a vehicle to which the cylinder is attached can be reduced.

Yet another object is to provide a master cylinder having improved features and which can be produced more easily and at lower cost than cast iron master cylinders.

Even another object is to provide a method for producing a master cylinder whereby machining thereon following a casting operation is reduced or eliminated.

Another object is to provide an improved master cylinder by using metals which can be diecast in forming integral component parts of the cylinder.

These and other objects and advantages of the invention will become apparent from the following description and the appended claims.

SUMMARY OF THE INVENTION

In accordance with the present invention, a steel tube having a bore therein for at least one hydraulic brake piston is incased within a light weight metal casting. Accordingly, a master cylinder is produced wherein the casting is in compressive contact with the exterior surface of the tube and extends over one end thereof. It is preferred that the tube comprise an integral end closure which is covered by the casting, and that drawn tubing be employed whereby reaming or honing of the piston bore is not required following application of the casting to the tube.

Preferably, the casting is produced by diecasting a metal around the steel tube which has a specific gravity below 7. More preferably, the diecasting metal will have a specific gravity below about 3, examples being alloys of aluminum or magnesium, with the latter being especially preferred. Needed perforations in the steel tube can be drilled or otherwise formed therein prior or subsequent to diecasting, and needed openings or channels in the casting can be produced by the diecasting operation as can other integral parts of the master cylinder such as mounting lugs thus obviating subsequent machining operations.

The present invention thus provide a strong, light weight master cylinder which comprises a steel tube having a cylinder bore therein for at least one hydraulic piston, and a casting of metal which incases the steel wall in compressive contact therewith. The tube has a closed end over which the casting extends, and which is also thereby encased by the casting. Postcasting reaming or honing of the cylinder bore can be eliminated by diecasting around a properly sized section of certified cold drawn steel tubing.

Master cylinders of the present invention can thus be produced relatively simply and inexpensively, whereby the use of a heavy casting of iron and subsequent machining thereof are avoided, by use of a steel tube that furnishes a tough, long wearing surface for contact with a hydraulic piston, and by use of a strong, light weight metal which is applied to the exterior of the tube in the form of a diecasting.

DESCRIPTION OF PREFERRED AND ALTERNATIVE EMBODIMENTS

Figure 1:
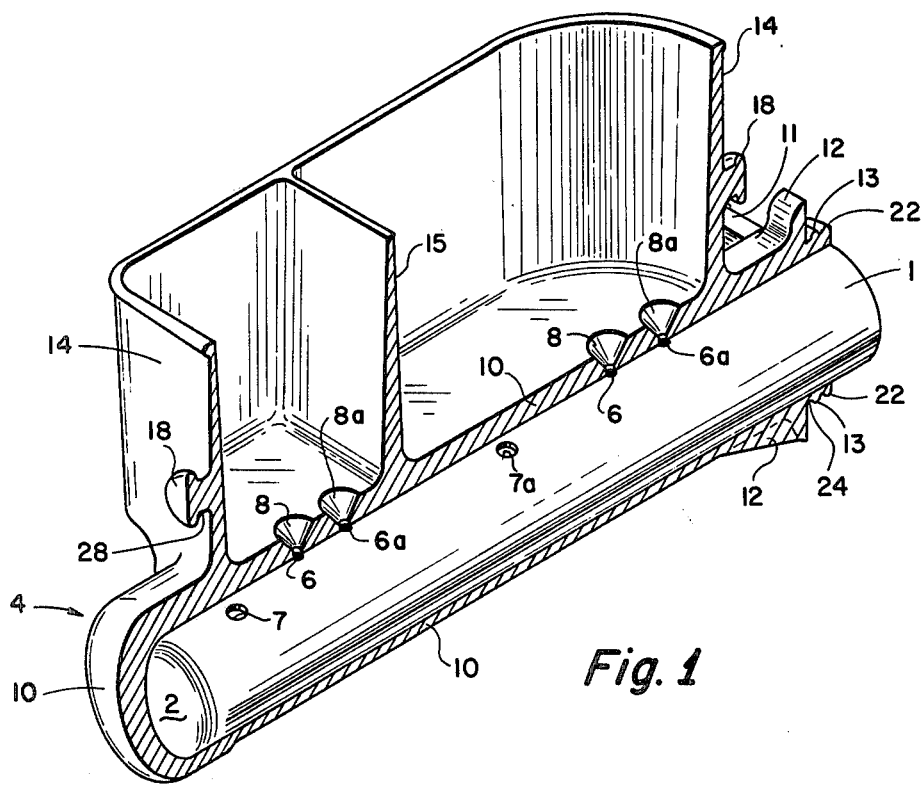
FIG. 1 is a sectional perspective view of a hydraulic brake master cylinder constructed in accordance with the present invention.
Figure 2:
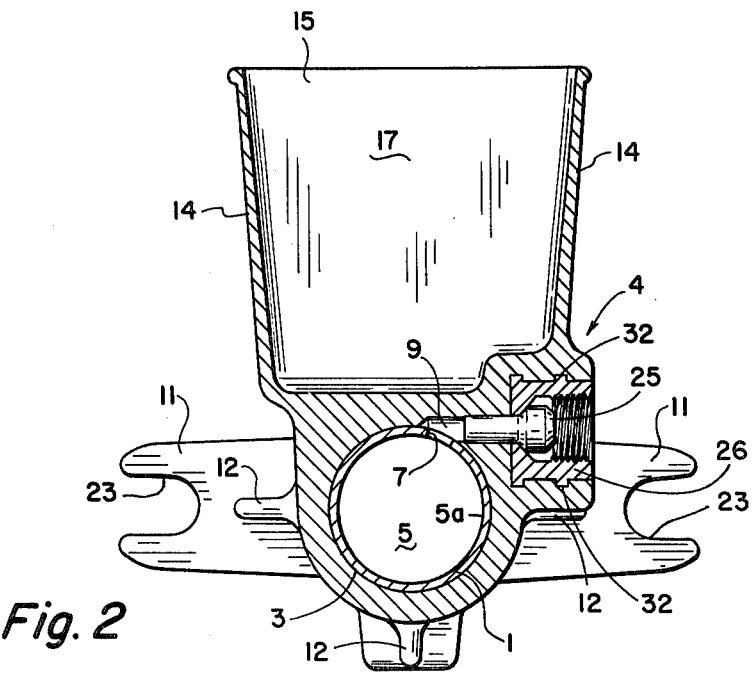
FIG. 2 is a front sectional view of the master cylinder of FIG. 1 taken along line A—A of FIG. 4.
Figure 3:
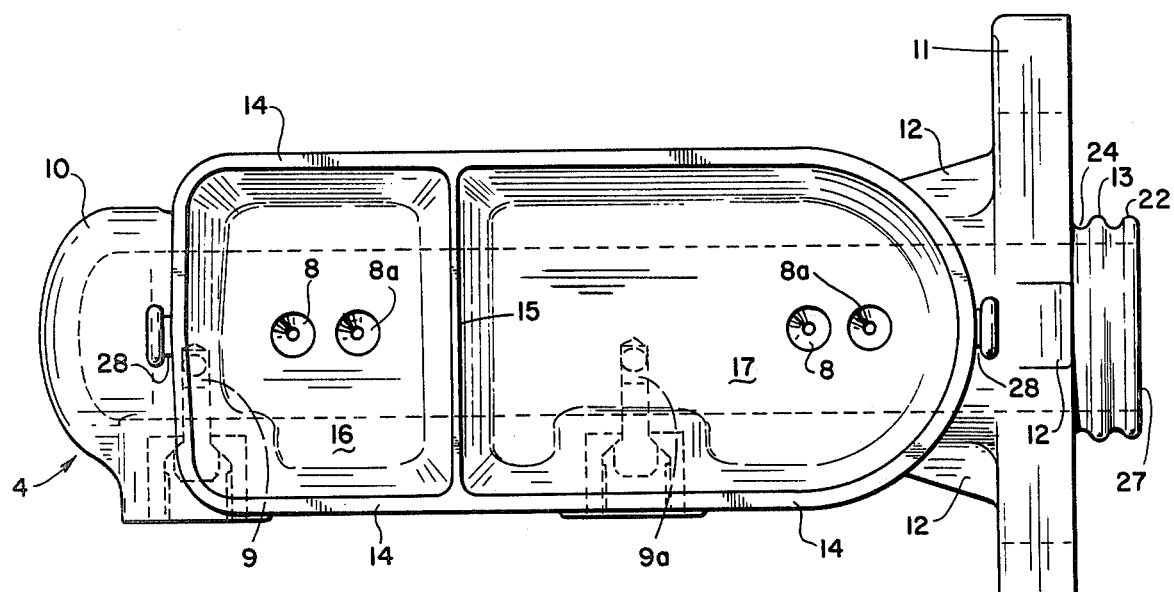
FIG. 3 is a top view of the master cylinder shown in FIG. 1.
Figure 4:
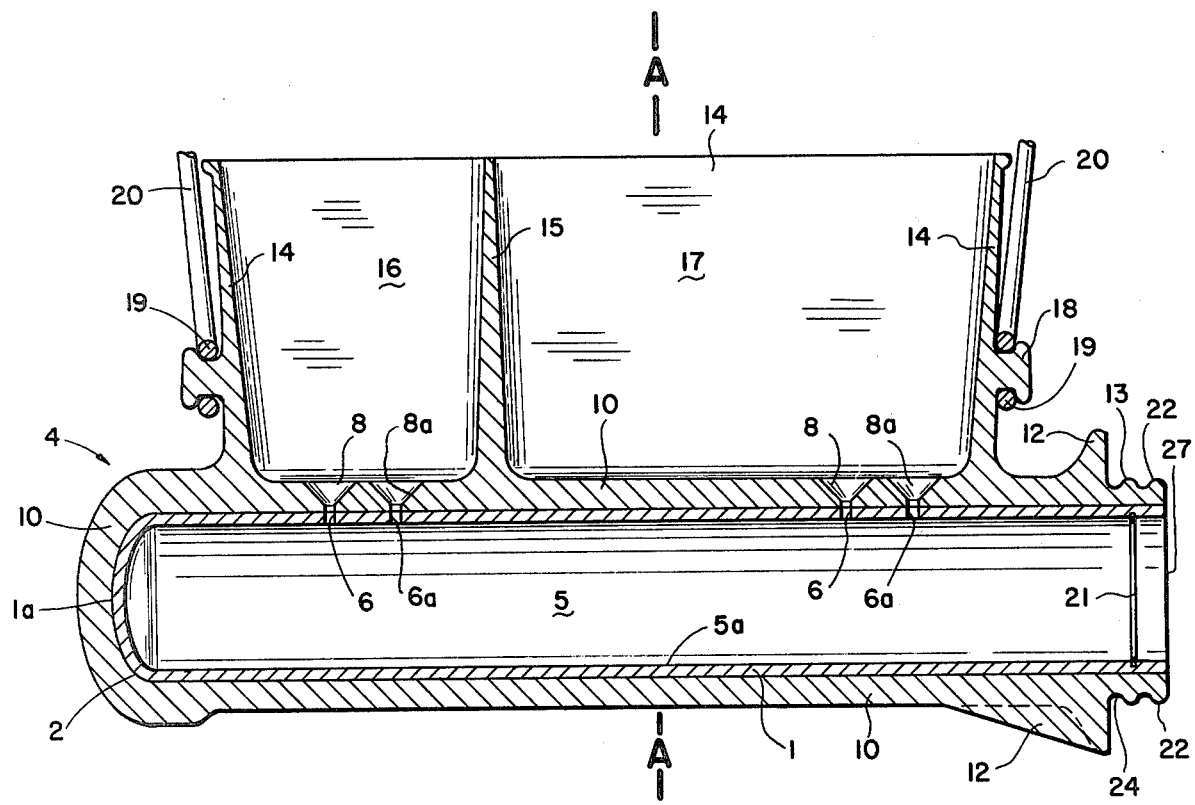
FIG. 4 is a sectional side view of the master cylinder shown in FIG. 1.

In FIG. 1, a section of cold drawn steel tubing is represented at 1, and is hereinafter referred to as "steel tube", or merely as "tube". One end of tube 1 has been closed off by means of an end closure which, in the illustrated case, is an integral portion of the tube which has been closed by the rolling method. Prior to application of the metal casting 4, the tube can be perforated to provide the piston bore 5 therein with feed inlets 6, piston relief holes 6a, and outlets 7 and 7a through the side wall of the tube, and which interconnect with inlet channels 8, relief channels 8a, and outlet channels 9 and 9a, respectively. Hydraulic brake fluid enters and leaves bore 5 of the tube through these inlet and outlet channels, respectively. When all work on the cylinder has been completed, bore 5 is a precision cylinder bore for dual hydraulic pistons (not shown). The bore has an end opening 27 through which the pistons are installed and removed, and through which the pistons are actuated to provide pressure in hydraulic brake lines which can lead from outlet channels 9 and 9a to wheel cylinders.

Diecastings can be produced at lower tooling costs per unit than can permanent mold castings. Several times as many castings can be produced from each die as from each permanent mold, and much less post-casting machining is required for diecastings. When producing the present master cylinder, it is therefore preferred that incasement of the steel tube in the metal casting be accomplished by casting in situ, i.e. by applying the casting metal in a heated, molten state to the tube while it is contained in a die, then allowing the metal to cool and solidify, and recovering a diecasting of the metal with the steel tube incased therein. The need for machining the casting to accomodate the tube, and for press-fitting the tube into the casting, can thus be altogether avoided, and compressive gripping of the exterior wall of the tube by the casting can be more uniform and of greater magnitude than results from press-fitting. To further advantage, the casting which surrounds the metal tube can comprise various openings, cavities, channels and outwardly extending parts which can be formed solely by the diecasting operation, and thereby eliminating the need to form them by machining. The problem of exposing porosities in the casting as a result of drilling reaming, etc. is also thus eliminated.

Diecasting of metals such as aluminum, magnesium, or zinc alloys around tube 1 can be effected by placing the tube in a casting die having inward projections which extend to and align with openings 6, 6a, 7 and 7a for formation of channels 8, 8a, 9 and 9a. The die can also include cavities having configurations that conform to the exterior of the body 10 of the casting around the tube 1, and which also conform to lugs 11, stiffeners 12, and a shoulder 13 of boot groove 24. Still other cavities of the die can conform to the exterior and interior of walls 14 and 15 which surround reservoirs 16 and 17 for brake fluid. Following the feeding of molten metal into the die, cooling takes place until the metal become solidified so that the tube and casting can be separated from the die as an integral unit. The inward projections separate from the casting along with the die, so that channels 8, 8a, 9 and 9a remain and extend from the outside of the casting to respective openings 6, 6a, and 7 in the wall of tube 1.

As shown in the drawings, the casting 4 can further include bosses 18 on the wall 14 of the reservoir and to which eyes 19 of a bail 20 can be attached to grooves 28 on the bosses. The bail is used to hold a lid (not shown) on the reservoirs 16 and 17. In addition, an internal groove 21 can be cut in the tube 1 adjacent the open end 27 thereof for insertion of a snap ring (not shown) which retains the dual pistons in the bore 5 of the tube. Alternatively, a second shoulder 22 can be molded on casting body 10 rearwardly of shoulder 13 for attachment of a retainer clip (not shown) as a substitute for the snap ring.

Bosses 18 represent an improvement in that attachment of bail 20 thereto by means of eye 19 permits location of the reservoir closer to the firewall of an automobile to which the master cylinder is attached. In accordance with previous arrangements, the bail makes a right angle bend and plugs into a hole drilled in reservoir wall 14, and room must be allowed between wall 14 and the firewall to accomodate the radius of the bend in the bail. In accordance with the present arrangement, the bail can rest against wall 14, thus eliminating the bend. Accordingly, the need to drill the casting to form receptacles for the ends of the bail is obviated.

It should also be noted that the flanging means such as lugs 11, which extend transversally with respect to the axis of bore 5 for attaching the master cylinder to the firewall, can be provided with indentions 23 which extend inward from the edge thereof to accomodate fastening means such as bolts or studs. Compared to use of circular holes for the fastening means, such indentions can be formed during the diecasting operation, thus eliminating the need for a more complex die or the need for drilling the diecasting as is normally required for forming circular openings in the lugs. One other improvement which should be pointed out is the casting of channels 9 and 9a with the threaded tubing connectors 26 in place, thereby obviating the need for drilling or threading of the diecasting, or the press-fitting of connectors. Tubing seats 25 can be inserted into the channels 9 and 9a prior to formation of the casting or afterwards.

It can be appreciated from the foregoing description that the master cylinder shown in the drawings can be rapidly produced by means of relatively few steps which include (1) perforating tube 1 by punching or drilling, (2) inserting the tube and any fittings of the master cylinder such as seats 25 and connectors 26 in a casting die, (3) supplying molten casting metal to the die, then separating the solidified casting from the die, and (4) recovering a diecasting having the tube 1 and any of said fittings tightly held in place therein by a compressive force which develops as the casting cools. To improve this gripping of the fittings by the casting, it is preferred that the exterior surface of the connectors 26 be roughened prior to casting, or the connectors can be provided with lugs 32 for this purpose, or else one or more external shoulders or grooves (not shown) can be used. Where necessary, other steps can include deburring the steel tube prior to casting of the metal, removal of any flashing from the casting, and cutting of the groove 21 in tube 1 before casting. In any event, a strong and durable master cylinder can be produced with less capital equipment, in a shorter time, with less effort, and at a lower cost than is required for producing cast iron cylinders in accordance with prior practices.

The term "steel" as used herein is intended to mean carbon steel or stainless steel, and the terms "tube" or "tubing" are intended in the broad sense to mean a cylindrical chamber surrounded by a metal wall, more particularly pipe or tubing in the usual sense, and advantageously tubing in the generally understood sense of having a relatively thin wall thickness and a light weight. Drawn steel tubing can be used to advantage since it provides a smooth, drawn surface 5a which surrounds the piston bore 5 so that no reaming or honing of the bore is required before or after the diecasting step. Certified cold drawn steel tubing is preferred in that it provides a light, tough cylinder wall which can withstand wear as a result of hydraulic piston movement, is of predictable high quality and strength, and has a uniform internal diameter prior to casting which is oversized with respect to that ultimately desired, but which becomes reduced to the desired diameter upon shrinkage of the casting when the molten metal cools and solidifies. This reduction of the tubing diameter can be quite uniform, thus eliminating any need for reaming or honing of the bore 5 to provide a close tolerance piston bore.

Any preferable and suitable casting metal can be used for incasing the tube as long as it provides the necessary strength and durability for hydraulic brake system usage, but it is preferred that the metal casting be light enough so as to effect a substantial lowering of weight as compared to cast iron. Metals having a specific gravity of below about 7 are thus preferred, examples being casting alloys of aluminum, magnesium and zinc. Alloys containing two or all three of these metals together can be used, as can alloys of any one of aluminum, magnesium or zinc in combination with one or more other metals. Use of metals having a specific gravity below about 3 is most preferred, examples being aluminum and magnesium alloys, the latter being most highly preferred. Advantages of diecasting magnesium alloys over those of aluminum include production of castings of lighter weight and lower porosity, smaller draft angle requirements, finer finished surfaces, longer die life, and shorter cycle time. Such advantages provide by magnesium alloys must be weighed against the lower cost of aluminum alloys, but this higher raw material cost can be at least partially offset by savings effected, for example, by a lower tooling cost, a faster casting rate, reduction of rejects, and longer die life. Neither should the fact be overlooked that use of diecasting metals rather than cast iron effects reduction of fuel depletion and cost since much less heat is required to melt diecasting alloys.

It will be noted that the master cylinder shown in the drawings comprises two reservoirs 16 and 17, and each of which has a feed inlet 6 and a piston relief hole 6a which lead into bore 5 of tube 1. Such a brake cylinder is used with a vehicle having a dual braking system with separate hydraulic lines which lead from the master cylinder to front and rear wheel cylinders. Where preferred, the master cylinder can be provided with only one integrally cast brake fluid reservoir, or even none, and with only one feed inlet such as 6 leading from the reservoir into the bore 5 of the steel tube.

As can be seen from the foregoing description, appropriate measures are taken which obviate any need for reaming, drilling or threading of the diecasting of the master cylinder. Accordingly, the opening up of porosities which normally exist in diecastings does not occur, thereby preserving the integrity of the casting for prevention of leaks. In addition, the threads of the connectors 26 can be high quality steel threads produced on a high speed screw machine, as opposed to threads formed in the metal of the diecasting itself.

As was previously indicated, it is preferred that the steel tube 1 have an integral end closure 1a that is an integral portion of the tube, and such as can be formed, for instance, by the roll closing method. It will be understood, that the end closure can be a metal cap which is placed on the tube prior to pouring of the casting, or such an end closure can be absent, and in which case the end of the tube becomes closed by the casting.

An improved master cylinder which accomplishes the previously stated objects has now been disclosed in detail, and even though there has been specific reference to particular materials, procedures, arrangement of parts, and the like, it will nonetheless be understood that even other embodiments will become apparent which are within the spirit and scope of the invention defined in the following claims.

What is claimed and desired to secure by Letters Patent is:

1. A method for producing a hydraulic brake master cylinder which comprises compressively encasing the outer wall and one end of a hollow empty steel tube with a metal casting, the encased end of the tube being closed, said steel tube having a substantially continuous external surface extending throughout the length of said tube capable of being uniformly subjected to externally applied pressure to substantially uniformly reduce in diameter throughout said length, wherein said tube has a bore therein for at least one hydraulic brake piston, said method including placing said tube in a permanent casting die the interior surface of which defines the exterior surface of said master cylinder and filling the die with a die casting metal having a specific gravity below about 7 while said metal is in a molten state, followed by cooling of said metal and recovery of a die casting having said tube and said end encased therein, said permanent casting die having at least one inward projection which extends to the surface of said tube, and wherein a casting is recovered having a channel which extends from the outside thereof to an opening in the wall of said tube in registration with said projection during the casting and cooling of said die casting metal.

2. A method as in claim 1 wherein said metal is a member of the group consisting of magnesium, aluminum, and alloys thereof.

3. A method as in claim 1 wherein said metal is a magnesium alloy.

4. A method as in claim 1 wherein said casting die further comprises cavities therein which become filled with said diecasting metal, and wherein a casting is recovered having an integral part thereof which conforms to the configuration of said cavities.

5. A method for producing an hydraulic cylinder comprising: casting a molten metal within a permanent casting die about the outer cylindrical surface of a drawn, hard, hollow empty metal tube having a smooth, hydraulic piston-receiving bore of oversize internal diameter for the piston received through an open end, said tube having a substantially continuous external surface extending throughout the length of said tube capable of being uniformly subjected to externally applied pressure to substantially uniformly reduce in diameter throughout said length, producing a substantially uniform reduction in diameter over substantially the length of said bore by shrinkage of said molten metal upon cooling and solidifying, said solidified metal forming a wall which is relatively thick compared to the wall of said tube, said permanent casting die having at least one inward projection which extends to the surface of said tube, and wherein a casting is recovered having a channel which extends from the outside thereof to an opening in the wall of said tube in registration with said projection during the casting and cooling of said die casting metal.

6. A method for producing an hydraulic cylinder comprising:
 (a) placing in a permanent casting die a drawn, hard, hollow empty metal tube having opposite ends and a cylindrical wall defining a smooth, hydraulic piston-receiving bore, the internal diameter of said bore being oversize in relation to the piston to be received through said open end; said tube having a substantially continuous external surface extending throughout the length of said tube capable of being uniformly subjected to externally applied pressure to substantially uniformly reduce in diameter throughout said length; said permanent casting die having at least one inward projection which extends to the surface of said tube;

(b) filling said die with a molten diecasting metal in covering relation to substantially the entire outer surface of said tube;

(c) cooling and solidifying said metal thereby producing a substantially uniform reduction in said internal diameter over the length of said bore by shrinkage of said molten metal upon said cooling and solidifying; and (d) recovering an hydraulic cylinder having solidified metal forming a wall which is under tension over said tube wall, and wherein a casting is recovered having a channel which extends from the outside thereof to an opening in the wall of said tube in registration with said projection during the casting and cooling of said die casting metal.

7. A method as set forth in claim 5 including closing one end of said tube by rolling prior to placing said tube in said casting die.

8. A method as set forth in claim 5 wherein said diecasting metal has a specific gravity below 7.

9. A method as in claim 6 in which a threaded tubing connector is aligned with said inward projection prior to filling said die with molten metal, and wherein said connector is gripped and rigidly held in place by the recovered casting and leads into said channel.

* * * * *